(No Model.)

C. T. ROGERS.
BICYCLE SADDLE.

No. 531,333. Patented Dec. 25, 1894.

Witnesses.
Lainity N. Möller
Anna B. Hammerick

Inventor.
Charles T. Rogers
by W. A. Copeland
his atty.

UNITED STATES PATENT OFFICE.

CHARLES T. ROGERS, OF MANSFIELD, MASSACHUSETTS.

BICYCLE-SADDLE.

SPECIFICATION forming part of Letters Patent No. 531,333, dated December 25, 1894.

Application filed September 24, 1894. Serial No. 523,877. (No model.)

*To all whom it may concern:*

Be it known that I, CHARLES T. ROGERS, a citizen of the United States, residing at Mansfield, in the county of Bristol and Commonwealth of Massachusetts, have invented a new and useful Improvement in Bicycle-Saddles, of which the following is a specification, reference being had to the accompanying drawings.

My invention consists of a bicycle seat pivoted on a transverse shaft which forms a part of the saddle frame, and having a spring which holds the seat in position on the shaft, also in making the seat in two sections each pivoted on said shaft also in the form of the saddle frame as will be more particularly described and claimed.

Figure 1:
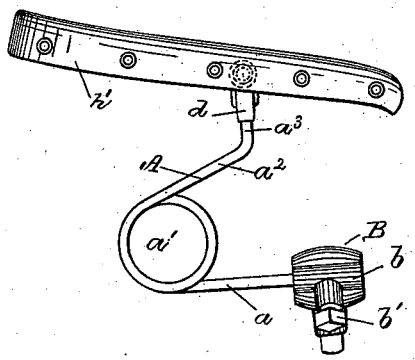
Figure 2:
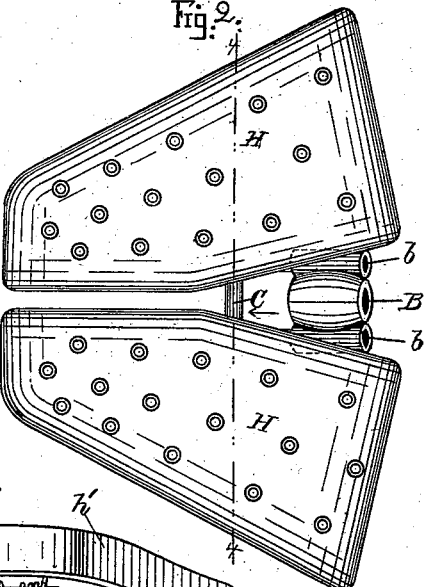
Figure 3:
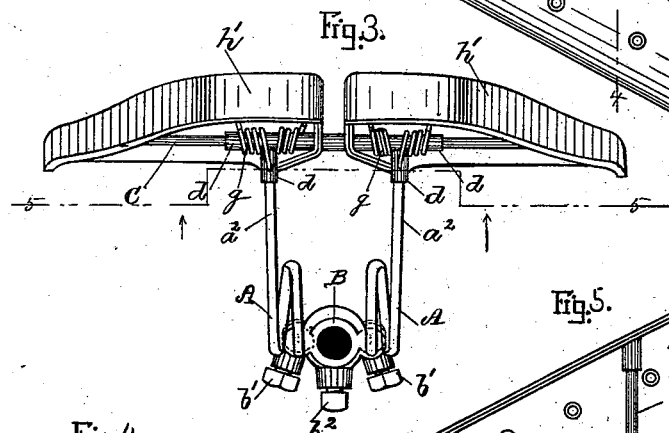
Figure 4:
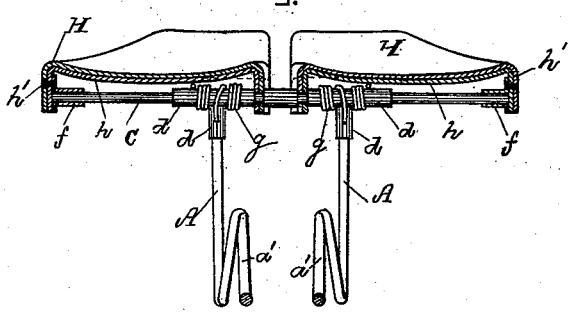
Figure 5:
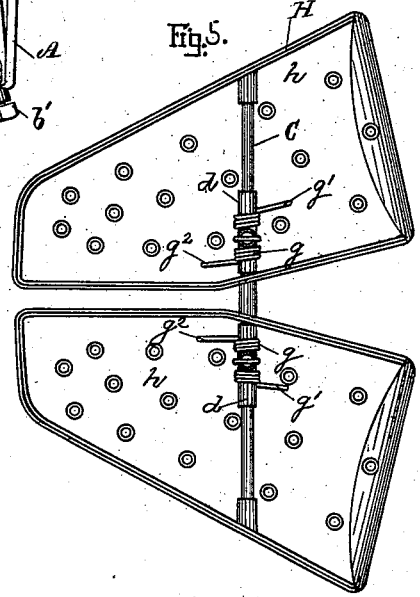

In the drawings, Figure 1 is a side elevation. Fig. 2 is a top plan view. Fig. 3 is a rear end view. Fig. 4 is a vertical section; and Fig. 5 is a bottom plan view with the spring cut off.

The main portion of the saddle frame consists of two spring rods A A supporting the transverse shaft C on which the seat is pivoted. Each spring rod A has an arm $a$ clamped at its forward end in a tubular ear $b$ on either side of the block B by clamping screw $b'$, said block having a central opening to receive the seat post to which it is clamped by the set screw $b^2$. The rods A A extend rearwardly, then make a coil forming an eye $a'$, thence the arms $a^2$ extend forwardly at an upward inclination forming a bow with the arms $a$ and terminate in the upright portions $a^3$ which are connected with the transverse shaft C by means of the tubular T pieces $d\ d$. The shaft C passes through the cross arm of the T pieces $d$ and is journaled at either end in a box $f$ secured to the flange of the seat. A wire spring $g$ is coiled about both branches of the cross arm and passes through the upright portion of the T piece and through the upright portion $a^3$ of the spring rod A, the ends $g'\ g^2$ of the spring extending along the under side of the seat transversely to the shaft and in opposite directions to each other. Thus the transverse shaft C and the spring rods A are both secured within the T pieces $d\ d$ and the seat is free to rock on the shaft against the tension of the spring $g$ whenever any downward pressure is brought to bear on the seat on either side of the shaft. When the pressure is removed, as by dismounting, the spring ends $g'\ g^2$ will return the seat to its normal position.

Instead of making the seat in one piece I prefer to make it in two parts H H detached from each other, each pivoted on the shaft and free to rock independently of the other according to the rising and falling movement of the legs and feet in operating the treadle. They are made to spread a little toward the front, and are concaved slightly to accommodate the form of the rider. This independent rocking feature causes the two sections to rock back and forth alternately with each other according to the movement of the legs in working the treadles and relieves from the severe pressure and chafing on the more sensitive parts of the body which are caused by the rigid saddle. The diverging of the inner edges of the two sections, forming an open space between them, also relieves the pressure on some of the organs of the body.

I make the seat with a metal base $h$ covered with leather and having a turned down flange $h'$ on the sides which support the boxes $f$ in which the shaft is journaled. The seat is perforated for ventilation and lightness, and eyelets in these perforations secure the metal base and leather cover together.

My improved seat is adapted for use on tricycles or any other form of velocipede and I do not intend to limit the application to bicycles.

What I claim as my invention is—

1. In a velocipede saddle, a saddle frame consisting of two spring rods having upright portions, a tubular T piece on the upper end of each upright portion, a transverse shaft passing through the cross parts of said T pieces, a divided seat consisting of two lateral portions each pivoted on said shaft, one above each of the spring rods and rocking independently of each other with the movement of the rider in operating the treadles, a coil spring around each of said T pieces and binding the spring rod and T piece together, and having oppositely projecting ends which bear against the seat and cause it to return to its normal position when the pressure is removed, substantially as described.

2. In a velocipede saddle, a seat-supporting frame consisting of two spring rods substantially parallel, throughout their length, each formed with a bow and an eye in the bow formed by a coil in the rod, and terminating in an upright portion, and a transverse shaft supported on the ends of the said upright portions, in combination with a seat pivoted on said transverse rod, and springs which hold the seat in its normal position except when under pressure and which allow a rocking movement of the seat when under pressure, substantially as described.

3. In a velocipede saddle, a seat supporting-frame consisting of two spring rods with their lower ends secured in a block mounted on the seat post, thence extending rearwardly and coiled to form an eye and thence extending forwardly to form a bow and thence upwardly, a transverse rod across the upper ends of the said spring rods, and tubular T pieces and springs which secure the spring rods and the transverse rod together, in combination with a divided seat composed of two independent portions pivoted on said transverse rod, the springs on the transverse rod causing the seat to return to its normal position when the tilting pressure is removed, substantially as described.

4. In a velocipede saddle, a block with central tubular opening and set screw whereby the block is secured to the seat post, tubular side ears to receive the seat frame, a seat supporting frame consisting of two spring rods with their lower ends clamped in the side ears of said block, thence extending rearwardly and coiled to form an eye and thence extending forwardly to form a bow, and thence upwardly, a transverse rod across the upper ends of the said spring rods, and tubular T pieces and springs which secure the spring rods and the transverse rod together, in combination with a divided seat composed of two independent portions with flanged sides pivoted on said transverse rod and tilting under pressure, the springs on the transverse rod causing the seat to return to its normal position when the tilting pressure is removed, substantially as described.

CHARLES T. ROGERS.

Witnesses:
FRANK M. COPELAND,
WILLIAM A. COPELAND.